(12) United States Patent
Rao et al.

(10) Patent No.: US 10,210,303 B2
(45) Date of Patent: Feb. 19, 2019

(54) SLEEP SIGNAL STITCHING TECHNIQUE

(71) Applicant: ARM Limited, Cambridge (GB)

(72) Inventors: Ravindra Narayana Rao, Austin, TX (US); Marlin Wayne Frederick, Jr., Austin, TX (US); Karen Lee Delk, Austin, TX (US); Stefan Charles Creaser, Austin, TX (US)

(73) Assignee: ARM Limited, Cambridge (GB)

( * ) Notice: Subject to any disclaimer, the term of this patent is extended or adjusted under 35 U.S.C. 154(b) by 108 days.

(21) Appl. No.: 15/418,613

(22) Filed: Jan. 27, 2017

(65) Prior Publication Data
US 2018/0218108 A1 Aug. 2, 2018

(51) Int. Cl.
*G06F 17/50* (2006.01)

(52) U.S. Cl.
CPC ...... *G06F 17/5081* (2013.01); *G06F 17/5072* (2013.01); *G06F 17/5077* (2013.01)

(58) Field of Classification Search
CPC .......................... G06F 17/5072; G06F 17/5077
USPC .......................................... 716/110, 112, 118
See application file for complete search history.

(56) References Cited

U.S. PATENT DOCUMENTS

| | | | | |
|---|---|---|---|---|
| 5,561,458 A * | 10/1996 | Cronin et al. | ....... | H04N 1/2112 348/231.7 |
| 7,590,962 B2 * | 9/2009 | Frenkil et al. | ...... | G06F 17/5031 326/33 |
| 7,987,441 B2 * | 7/2011 | Frenkil et al. | ...... | G06F 17/5031 326/33 |
| 9,592,005 B2 * | 3/2017 | Oakhill | .................. | G16H 50/30 |
| 9,666,266 B1 * | 5/2017 | Ji et al. | ................. | G11C 11/418 |

* cited by examiner

*Primary Examiner* — Sun Lin
(74) *Attorney, Agent, or Firm* — Pramudji Law Group PLLC; Ari Pramudji

(57) ABSTRACT

Various implementations described herein are directed to an apparatus having a receiver module that receives a floorplan of an integrated circuit having power gates, an obstruction, and a control pin for providing a sleep signal. The apparatus can include an identifier module that identifies where the obstruction interrupts a sequence of the power gates, organizes the sequence of the power gates into a column, and divides the column into segments in which a first segment lies below the obstruction, a second segment lies above the obstruction, and a third segment is offset from the first segment and the second segment. The apparatus can include a stitcher module that performs a sleep signal stitching for the integrated circuit by distributing the sleep signal from the control pin to the power gates that include each power gate in each of the first segment, the second segment, and the third segment.

20 Claims, 13 Drawing Sheets

SLEEP SIGNAL STITCHING TECHNIQUE

BACKGROUND

This section is intended to provide some information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Integrated circuits may include power gating to reduce power consumption. Power gating may be used to shut off current to blocks of an integrated circuit when those blocks are not in use. In fine-grained power gating, specialized standard cells may be distributed throughout a power gated blocks' standard cell area in a set pattern. These specialized cells may be referred to as power switches or power gates and may use various types of transistors to disconnect an external power supply from a power standard cell rail or to disconnect an external ground supply from a ground standard cell rail. Some standard cells in a block may receive a power/ground supply through standard cell rails. In some situations, a sleep signal may be routed to power switch cells. When the sleep signal is active, current from an always-on power supply may be shut off to a respective standard cell rail. In some cases, pre-placed obstructions in a floorplan of an integrated circuit design may cause power switches to be placed off of a set pattern. These obstructions may block a path of the sleep signal. As such, there is a need for an efficient way to connect sleep signals to power switches that accounts for floorplan obstructions so as to reduce the signal routing impact of the sleep signal.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein are directed to providing sleep signal stitching schemes and techniques in accordance with various implementations described herein. Sleep Signal Stitching (SSS) refers to a process of distributing a sleep signal to power gates in a floorplan, and sleep signal stitching schemes and techniques described herein provide for efficiently distributing the sleep signal to the power gates in a floorplan that may have interruptions due to hard macros. In some cases, the sleep signal may be distributed to inhibit insertion of always-on buffers that may use non-rail, always-on power supplies, which adversely consume placement and routing resources. As such, the sleep signal stitching schemes and techniques described herein may provide for distributing the sleep signal for a floorplan having one or more obstructions (e.g., hard macros) and power gate columns. The sleep signal stitching schemes and techniques described herein may improve energy management including reducing current draw during power-up.

Various implementations of providing various sleep signal stitching schemes and techniques will now be described in detail herein with reference to FIGS. 1-6.

Figure 1:
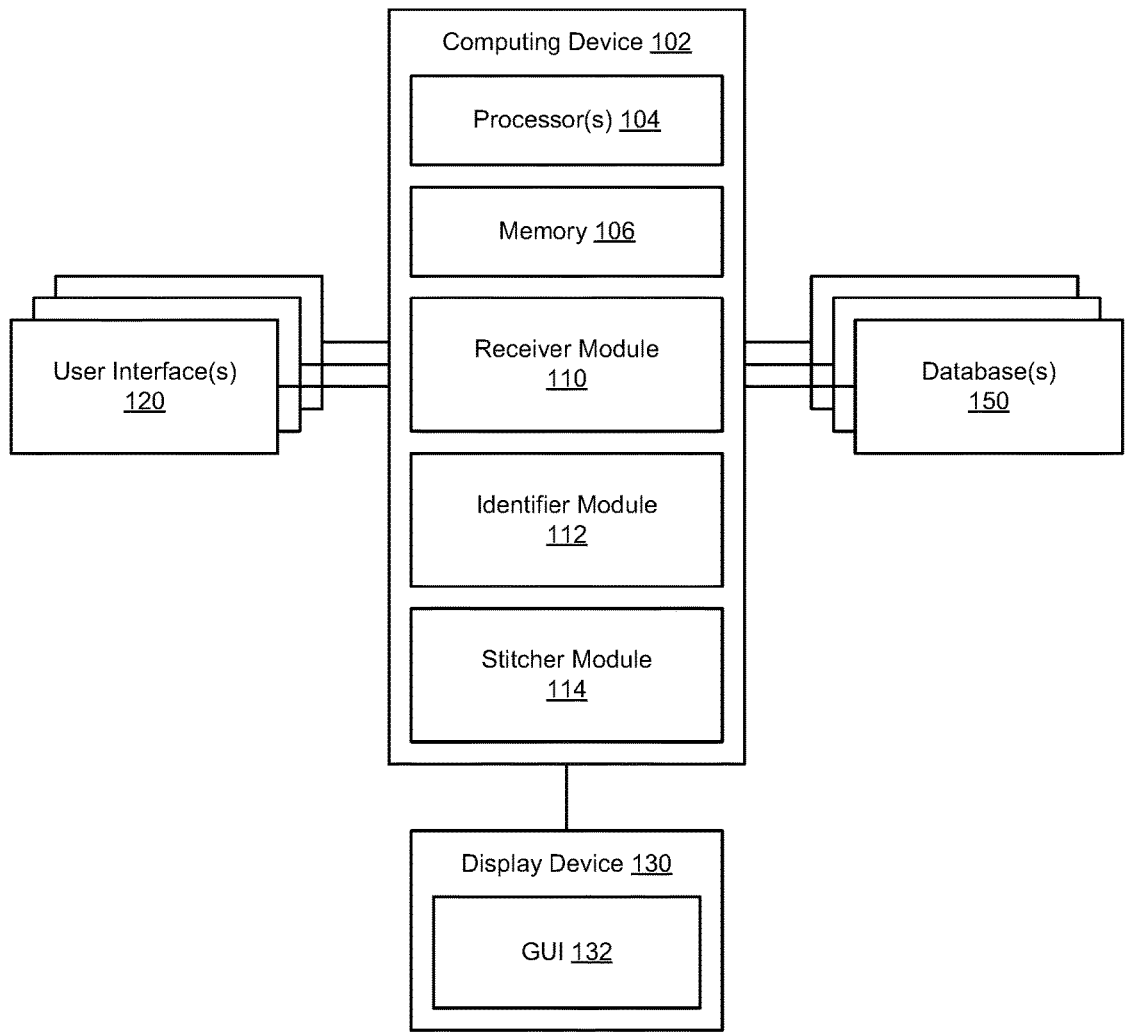
FIG. 1 illustrates a block diagram of a system for implementing a sleep signal stitching technique in accordance with various implementations described herein.

FIG. 1 is a block diagram illustrating one embodiment of an apparatus 100 that utilizes a computing device 102 for implementing sleep signal stitching schemes and techniques with various methods associated therewith.

In reference to FIG. 1, the apparatus 100 may be implemented as a system having the computing device 102 purposed for sleep signal stitching, thereby transforming the computing device 102 into a special purpose machine dedicated to implementation of sleep signal stitching schemes and techniques, as described herein. Thus, the computing device 102 may include standard element(s) and/or component(s), including at least one processor(s) 104, memory 106 (e.g., non-transitory computer-readable storage medium), peripherals, power, and various other computing elements and/or components that are not specifically shown in FIG. 1. Further, as shown in FIG. 1, the apparatus 100 may be associated with a display device 130 (e.g., a monitor or other display) that may be used to provide a graphical user interface (GUI) 132. In some instances, the GUI 132 may be used to receive input from a user (e.g., user input) associated with sleep signal stitching schemes and techniques. In other instances, one or more other user interfaces (UI) 120 (e.g., one or more other computing devices having GUIs or similar) may be used to receive input from one or more other users (e.g., other user input) associated with sleep signal stitching schemes and techniques. The apparatus 100 may also be associated with one or more databases 150 that may be configured to store and/or record data and information related to the users and sleep signal stitching schemes and techniques.

Accordingly, the apparatus 100 may thus include the computing device 102 and instructions stored or recorded on the computer-readable medium 106 (or the one or more databases 150) and executable by the at least one processor 104. The apparatus 100 may be utilized for implementing sleep signal stitching schemes and techniques. Further, the apparatus 100 may include the display device 130 for providing output to a user, and the display device 130 may include the GUI 132 for receiving input from the user. In some cases, the one or more UIs 120 may be used for providing output to one or more other users and receiving input from the one or more other users.

The computing device 102 may include one or more modules, such as, e.g., a receiver module 110. In some scenarios, the receiver module 110 may receive a floorplan of an integrated circuit having multiple power gates, one or more obstructions, and one or more control pins for providing a sleep signal. The floorplan may include a collection of chains, and each chain in the collection of chains may include a collection of power gates coupled to the one or more control pins. In some cases, power-gates in a given chain may be coupled to a unique control pin, and if there are multiple chains, power-gates in distinct chains may be coupled to distinct, unique control pins.

Figure 2A:
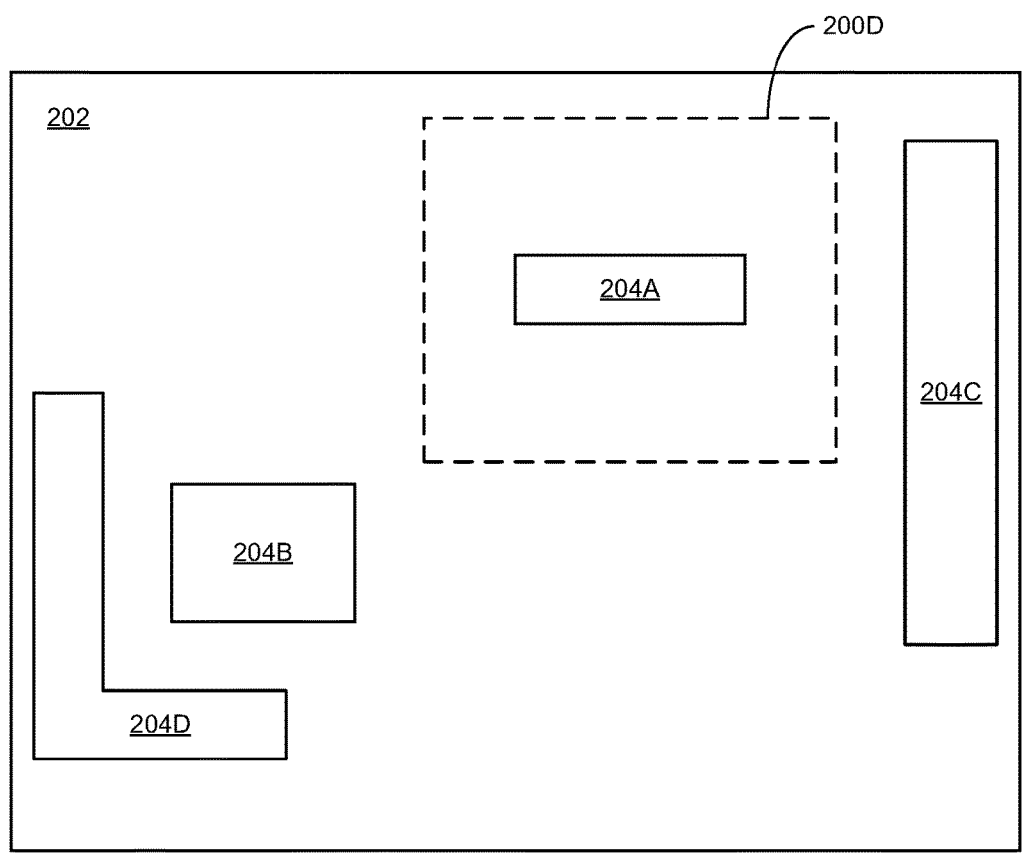
FIGS. 2A-2E illustrate diagrams of floorplan layout architecture in accordance with various implementations described herein.
Figure 2B:
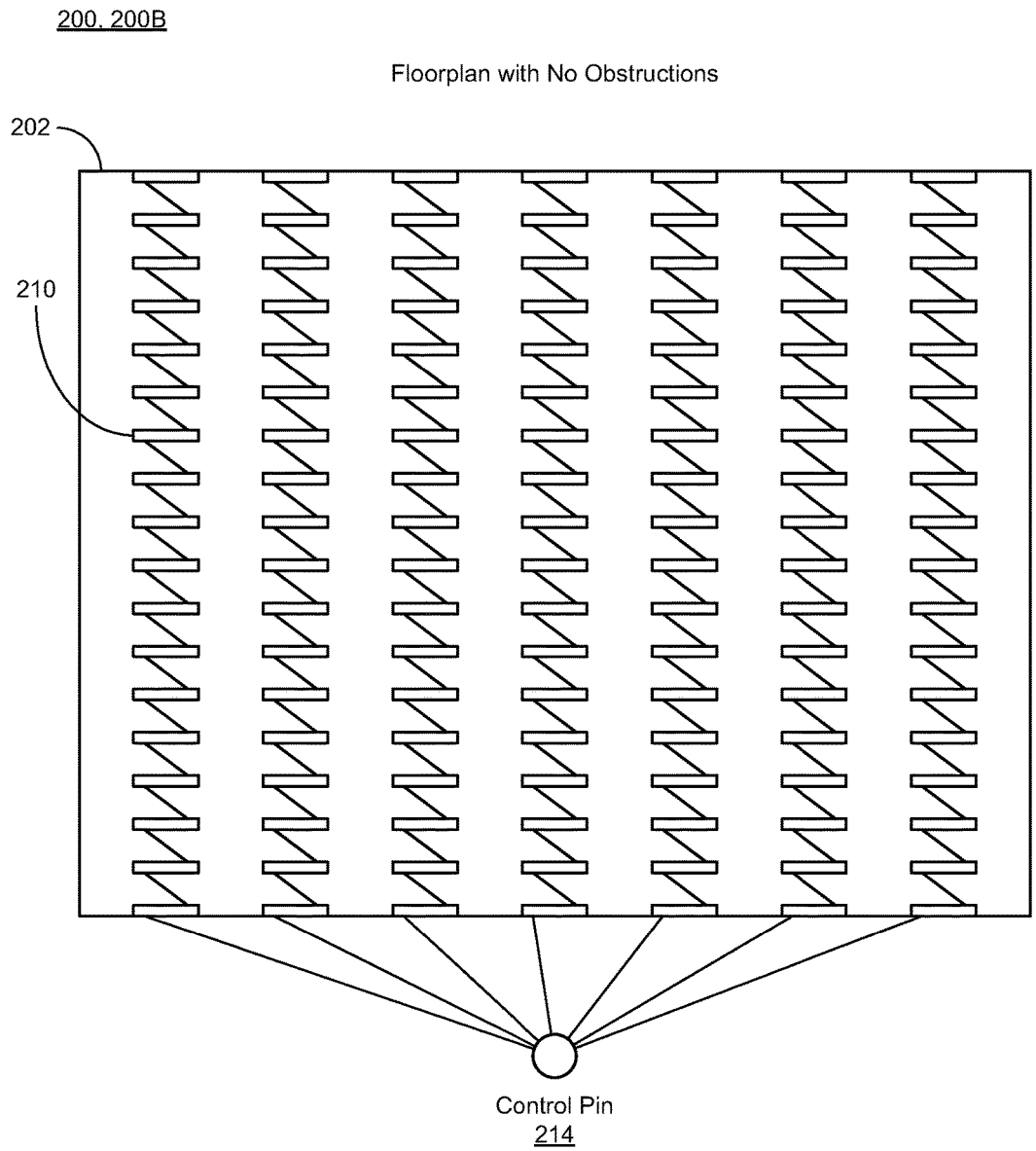
Figure 2C:
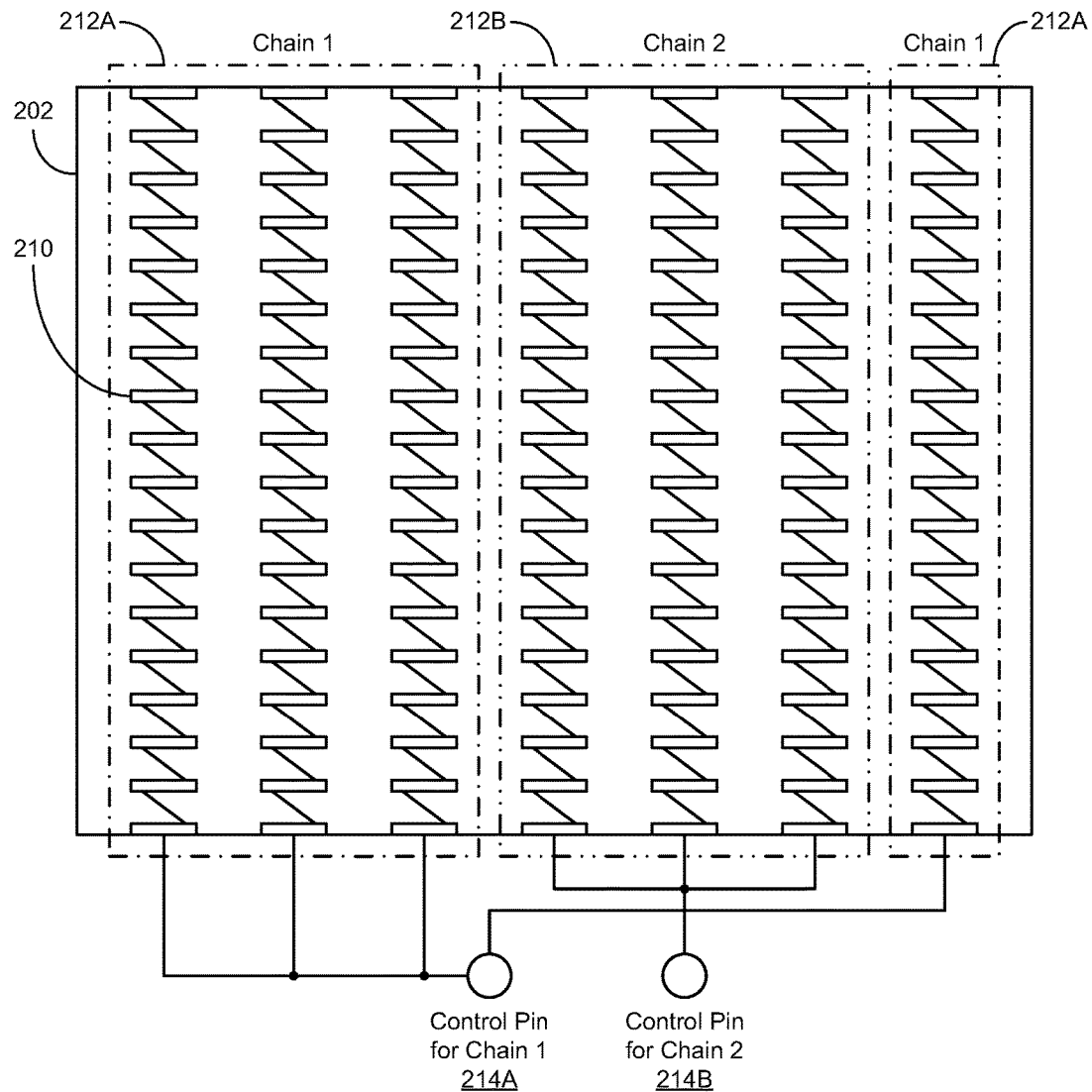
Figure 2D:
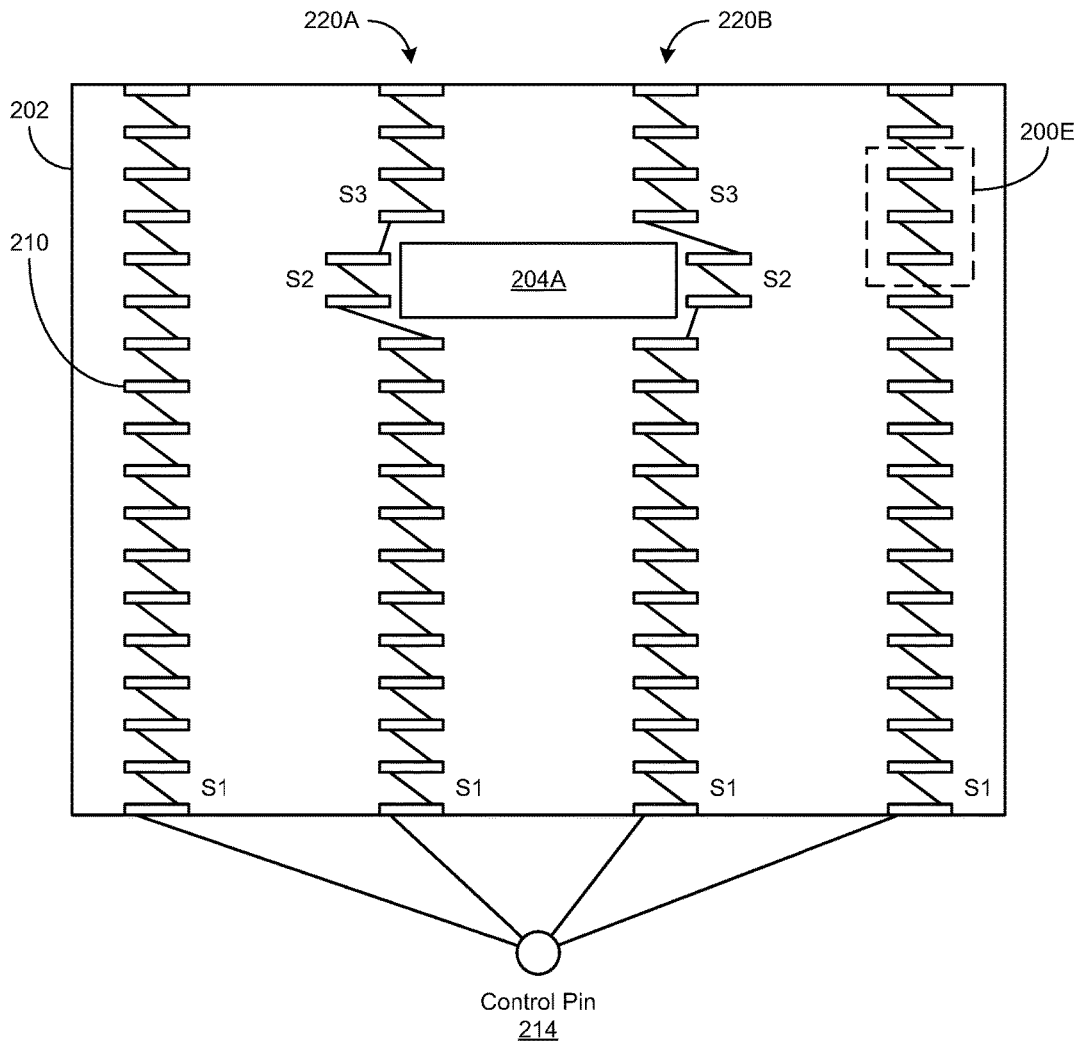
Figure 2E:
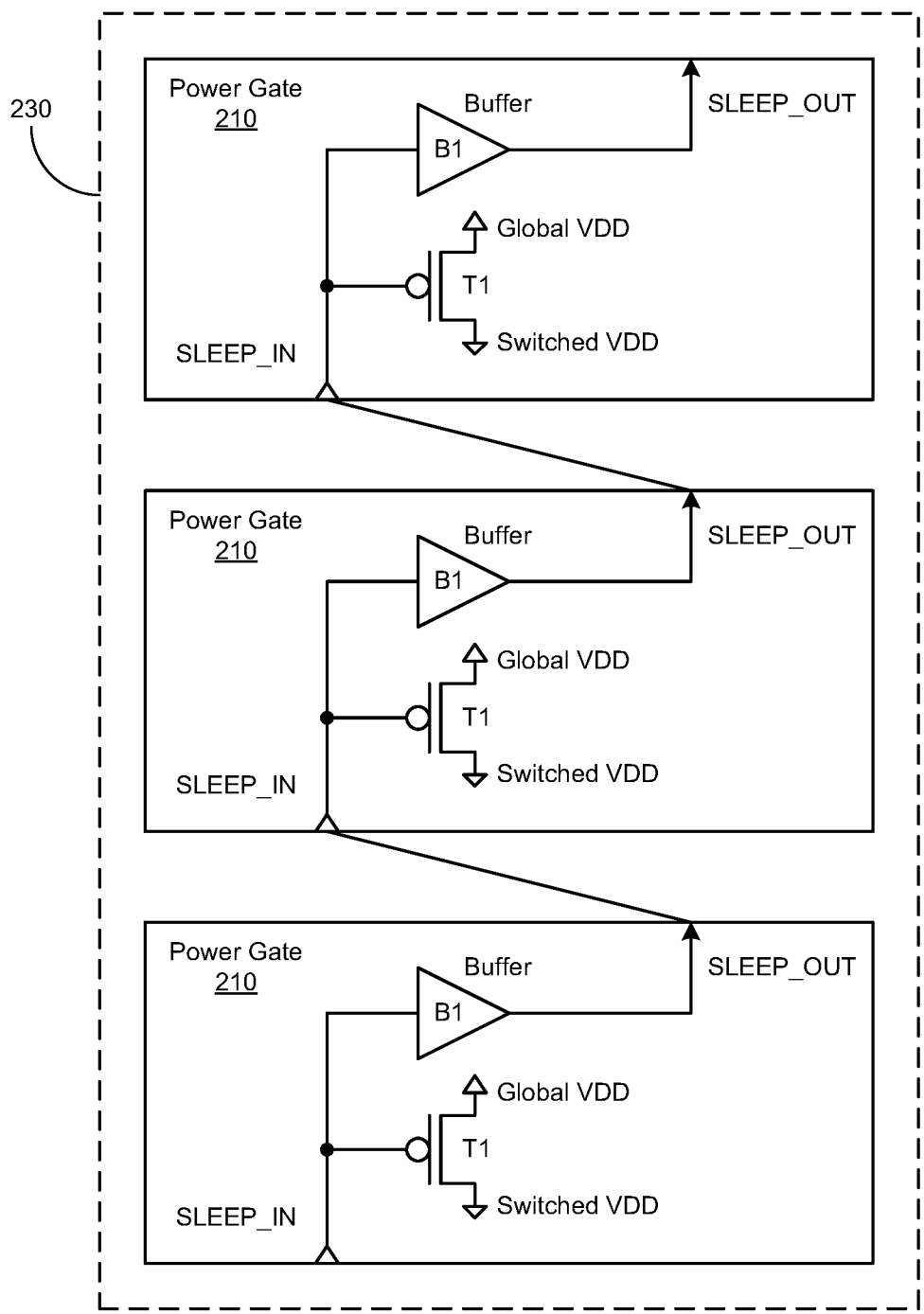

As shown in FIG. 2E, each of the power gates may be implemented as a cell with at least two pins including, e.g., a sleep input pin (SLEEP_IN) and/or a sleep output pin (SLEEP_OUT). The sleep input pin of each power gate may receive the sleep signal from the control pin or from the sleep output pin of another power gate. In some instances, arrival of the sleep signal may switch each of the power gates to an active state which may then supply power to rails (e.g., VDD, VSS, etc.) from which various standard cells (SC) of the integrated circuit derive their power.

The floorplan may include the one or more obstructions as part of a collection of one or more non-overlapping obstructions. The one or more obstructions may refer to a macro or hard macro and shaped as a polygon. In some instances, each of the one or more obstructions may be contoured as a rectilinear region in the form of a rectangle or an L-shape. As shown in FIGS. 2B-2D, the sequence of power gates may include in a linear sequence of the power gates arranged in one or more vertical columns, and the one or more obstructions may interrupt the linear sequence of the power gates. As shown in FIG. 2A, each of the obstructions may be defined by a macro (i.e., hard macro) that may represent at least one component of the integrated circuit, such as, e.g., a core, a memory, a double data rate (DDR) unit, a power management unit, etc.

The computing device 102 may include an identifier module 112. In some scenarios, the identifier module 112 may identify where each of the obstructions interrupt a sequence of the power gates, organize the sequence of the power gates into one or more columns, and divide the one or more columns into multiple segments. For instance, as shown in FIG. 2D, the identifier module 112 may divide at least one column into a first segment that may lie below an obstruction, a second segment that may lie above the obstruction, and a third segment that is offset from the first and second segments. In this instance, information about the third segment being routed around the obstruction may be received so as to avoid the obstruction. In some cases, the information may include information related to relocating the position of the power gates in the third segment around the obstruction.

Figure 3A:
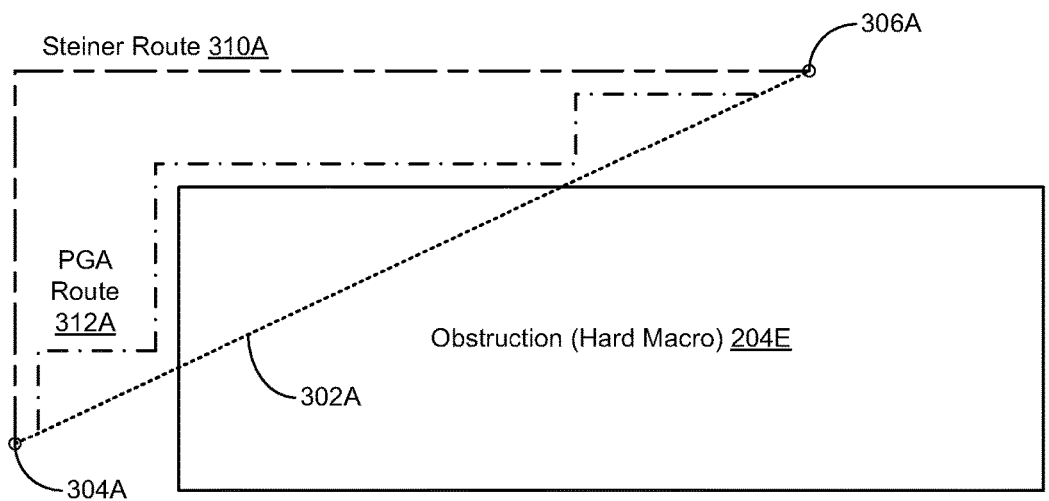
FIGS. 3A-3B illustrate various Steiner routing techniques (e.g., using paths for computing distance between start and destination points) in accordance with various implementations described herein.
Figure 3B:
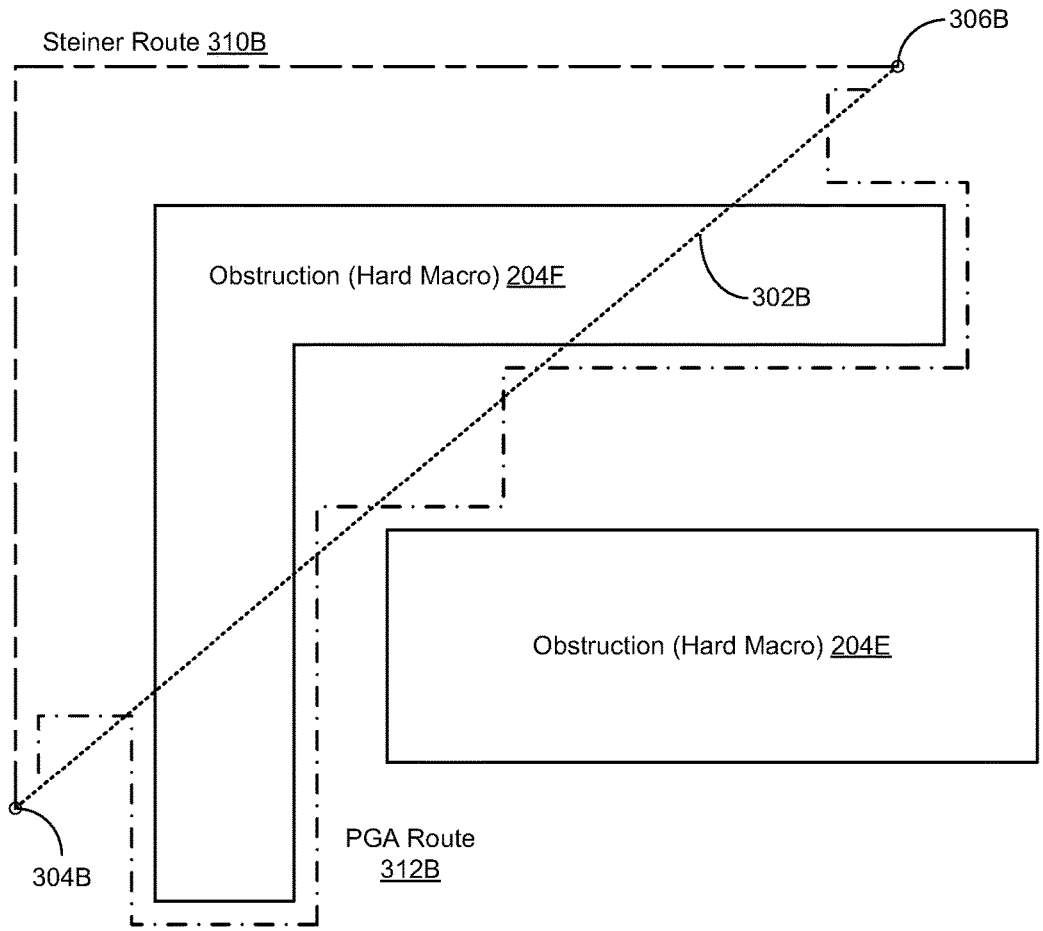

As shown in FIGS. 3A-3B, a distance between two points in the floorplan may be measured using a Steiner metric. In some cases, if there is no obstruction (e.g., a hard macro) between two points, then a path between the two points is not interrupted, and thus, the Steiner metric may be used to calculate the distance between the two points. In other cases, if there is at least one obstruction (e.g., at least one hard macro) between the two points, then the distance may be computed by following edges of the obstruction. In some cases, the sleep signal stitching schemes and techniques described herein may determine whether a straight line between two points is interrupted by an obstruction, and in these cases, the Steiner distance may be computed by following edges of the obstruction. As such, the sleep signal stitching schemes and techniques described herein may frequently compute a Steiner distance between two points in a floorplan when the floorplan has an arbitrary number of obstructions (e.g., hard macros).

Further, the computing device 102 may include a stitcher module 114. In some scenarios, the stitcher module 114 may perform sleep signal stitching for the integrated circuit by distributing a sleep signal from a control pin to the multiple power gates including each power gate in each of the first, second, and third segments. In some instances, the stitcher module 114 may distribute the sleep signal from the control pin to the multiple power gates by coupling the control pin to each power gate to thereby provide the sleep signal to each power gate. These and various other features associated with sleep signal stitching is described in greater detail herein below.

In reference to FIG. 1, the apparatus 100 is shown using various functional blocks or modules that represent discrete functionality. However, it should be understood that such illustration is provided for clarity and convenience, and therefore, it should be appreciated that the various functionalities may overlap or be combined within a described block(s) or module(s), and/or may be implemented by one or more additional block(s) or module(s) that are not specifically illustrated in FIG. 1. Further, it should be understood that various standard and/or conventional functionality that may be useful to the apparatus 100 of FIG. 1 may be included as well even though such standard and/or conventional elements are not illustrated explicitly, for the sake of clarity and convenience.

As described herein, a 'metric' may define a procedure that accepts some input and produces an output. The input may refer to two points in a two-dimensional (2D) plane, and the output may refer to a 'distance'. A 'path' may refer to a set of ordered points (a sequence) in a 2D plane, and a set may include more than two points. In the case of SSS, there may be an even number of points. There may be a rule to calculate or compute a distance from a first point in a sequence to a last point the sequence. This rule may be part of SSS. A 'distance' is a non-negative real number (e.g., zero or larger). A 'Steiner metric' may refer to a specific procedure that accepts two points as an input and produces a distance as an output, and this distance may be referred to as a 'Steiner distance'. The Steiner metric may define a distance as 'abs(x2−x1)+abs(y2−y1), where (x1, y1) and (x2, y2) are the coordinates of two points in a 2D plane. The terms 'obstruction', 'macro', 'hard macro', and 'polygon' may be used interchangeably, such as, e.g., in reference to a rectilinear region of the floorplan that does not include power gates. In some cases, the shape of rectilinear region may be of interest to sleep signal stitching (SSS), and this shape may be rectilinear, wherein each side is either horizontal or vertical. As further described herein below, if there is no hard macro between (x1, y1) and (x2, y2), then SSS may use the Steiner metric to calculate or compute distance between two points.

FIGS. 2A-2E illustrate various diagrams of floorplan layout architecture 200 in accordance with various implementations described herein.

In particular, FIG. 2A illustrates a block diagram 200A of the floorplan layout architecture 200. As shown, the floorplan layout architecture 200 may include a floorplan 202 of an integrated circuit having one or more obstructions 204A, 204B, 204C, 204D, such as, e.g., macros or hard macros. Thus, each of the one or more obstructions 204A, 204B, 204C, 204D may be defined by a macro or hard macro that represents a component of the integrated circuit having, e.g., a core, a memory, a double data rate (DDR) unit, or a power management unit. The obstructions 204A, 204B, 204C, 204D may be part of a collection of non-overlapping obstructions. Further, as shown, each of the obstructions 204A, 204B, 204C, 204D may be formed or contoured in a shape resembling a rectilinear region, such as, e.g., in a form of a rectangle or an L-shape region. For further discussion, a portion 200D of the floorplan 202 is described in reference to FIG. 2D.

Further, the floorplan 202 may be associated with data and information related to fabrication parameters for applying an integrated circuit design to a semiconductor wafer. As such, the floorplan 202 may identify parameter variations within the integrated circuit that allow the integrated circuit to function properly when the integrated circuit is etched onto the semiconductor wafer. The floorplan 202 may be represented with one or more data structures having various data and information associated with fabricating an integrated circuit on a semiconductor substrate or wafer, and further, the integrated circuit may be formed of multiple structural layers including multiple logic layers, multiple metal layers, and/or any number of layer coupling vias.

FIG. 2B illustrates a block diagram 200B of the floorplan layout architecture 200. As shown, the floorplan layout architecture 200 may include the floorplan 202 of an integrated circuit having multiple power gates 210 arranged in columns and a control pin 214 for providing a sleep signal to the power gates 210. As shown, the floorplan 202 may include a collection of chains, wherein each chain in the collection of chains may include a collection of power gates 210. Further, in FIG. 2B, the floorplan 202 is shown with no obstructions, such as, e.g., macros or hard macros.

FIG. 2C illustrates a block diagram 200C of the floorplan layout architecture 200. As shown, the floorplan layout architecture 200 may include the floorplan 202 with multiple power gates 210 arranged in columns and multiple control pins 214A, 214B for providing sleep signals to the power gates 210. In this instance, the floorplan 202 includes multiple chains 212A, 212B, wherein each chain 212A, 212B may include a collection of power gates 210. Further, in FIG. 2C, the floorplan 202 is shown with no obstructions (e.g., macros or hard macros) and multiple chains 212A, 212B.

In some scenarios, as shown in FIG. 2C, the multiple chains 212A, 212B may include a first chain 212A of power gates 210 and a second chain 212B of power gates 210, and the multiple control pins 214A, 214B may include a first control pin 214A and a second control pin 214B. As further shown, the first chain 212A of power gates 210 may be coupled to the first control pin 214A, and the second chain 212B of power gates 210 may be coupled to the second control pin 214B.

FIG. 2D illustrates a block diagram 200D of the floorplan layout architecture 200. As shown, the floorplan layout architecture 200 may include the floorplan 202 of an integrated circuit having multiple power gates 210 arranged or organized in columns and at least one control pin 214 for providing a sleep signal to the power gates 210. Further, in FIG. 2D, the floorplan 202 is shown with at least one or a single obstruction 204A, such as, e.g., macro or hard macro. For further discussion, a portion 200E of the floorplan 202 is described in reference to FIG. 2E.

As further shown in FIG. 2D, the obstruction 204A may interrupt one or more sequences of power gates, such as, e.g., a first sequence 220A of power gates 210 and a second sequence 220B of power gates 210. In some instances, each sequence 220A, 220B of power gates 210 may include a linear sequence of the power gates 210 that may be arranged in one or more vertical columns, and as shown in FIG. 2D, the at least one obstruction 204A may interrupt the linear sequences of the power gates 210.

In some scenarios, the first and second sequences 220A, 220B of power gates 210 may be organized into multiple columns, and each of the multiple columns may be divided into multiple segments S1, S2, S3. For instance, a first segment S1 may lie below the obstruction 204A, a third segment S3 may lie above the obstruction 204A, and a second segment S2 may be offset from the first and third segments S1, S3. In this instance, the second segment S2 may be routed around the obstruction 204A by modifying a position of the power gates 210 in the second segment S2 so as to avoid the obstruction 204A. Once the re-routing has taken place, sleep signal stitching (SSS) may be performed for the integrated circuit by distributing the sleep signal from the control pin 214 to the power gates 210 including each power gate 210 in each of the first, second, and third segments S1, S2, S3. The sleep signal may be distributed from the control pin 214 to the multiple power gates 210 by coupling the control pin 214 to a first power gate in a sequence of power gates 210 to thereby provide the sleep signal to each power gate 210 via each other power gate. Further, in some instances, the position of the power gates 210 in the second segment S2 may have been relocated around the obstruction 204A.

FIG. 2E illustrates a block diagram 200E of a portion power gate chain 230, as shown in reference to the floorplan 202 in FIG. 2D. As shown, each power gate 210 may comprise a cell with at least two pins including a sleep input pin (SLEEP_IN) and a sleep output pin (SLEEP_OUT). In various scenarios, the sleep input pin (SLEEP_IN) of each power gate 210 may receive the sleep signal from the control pin 214 or from the sleep output pin (SLEEP_OUT) of another power gate 210. During operation, arrival of the sleep signal may switch each power gate 210 to an active state (e.g., an ON state), which may then supply power to rails (e.g., power supply rails, such as VDD, VSS, etc.) from which standard cells (SC) of the integrated circuit derive their power.

As further shown in FIG. 2E, each of the power gates 210 may be embodied as a cell having at least one transistor T1 (e.g., PMOS transistor) and at least one buffer B1 (e.g., an operational amplifier). In some scenarios, these components T1, B1 may be arranged in each cell to receive the sleep signal via the sleep input pin (SLEEP_IN) and provide the sleep signal via the sleep output pin (SLEEP_OUT). Further, the at least one transistor T1 may be coupled between a global VDD rail and a switched VDD rail.

FIGS. 3A-3B illustrate various Steiner paths 300 in accordance with various implementations described herein. For instance, FIG. 3A illustrates a Steiner path 300A between two points around an obstruction, and FIG. 3B illustrates another Steiner path 300B between two points around a non-trivial combination of multiple obstructions.

In particular, FIG. 3A shows that an Euclidean distance 302A between two points 304A, 306A in a floorplan may be measured using an Euclidean metric, wherein if an obstruction 204E is between the two points 304A, 306A, then the distance of a Steiner path 310A may be computed by following edges of the obstruction 204E. The sleep signal stitching schemes and techniques described herein provide for a more efficient calculation of the distance of the Steiner path 310A between two points by demonstrating that this distance may result from summing smaller distances that are each calculated using the Steiner metric by following along the edges of the obstruction 204E (e.g., a hard macro). For instance, using the Steiner metric, the Steiner path 310A may be identified as an efficient calculation for determining the sleep signal stitching path between the two points 304A, 306A.

Further, FIG. 3B shows that another Euclidean distance 302B between two points 304B, 306B in a floorplan may be measured using the Euclidean metric, wherein if multiple obstructions 204E, 204F are between the two points 304B, 306B, then the distance of another Steiner path 310B may be computed by following edges of the obstructions 204E, 204F. Using the sleep signal stitching schemes and techniques described herein provide for a more efficient calculation of the distance of the Steiner path 310B between two points by demonstrating that this distance may result from summing smaller distances that are each calculated using the Steiner metric by following along the edges of the obstruction 204E (e.g., a hard macro). For instance, using the Steiner metric, the Steiner path 310B may be identified as an efficient calculation for determining the sleep signal stitching path between the two points 304B, 306B.

Figure 4A:
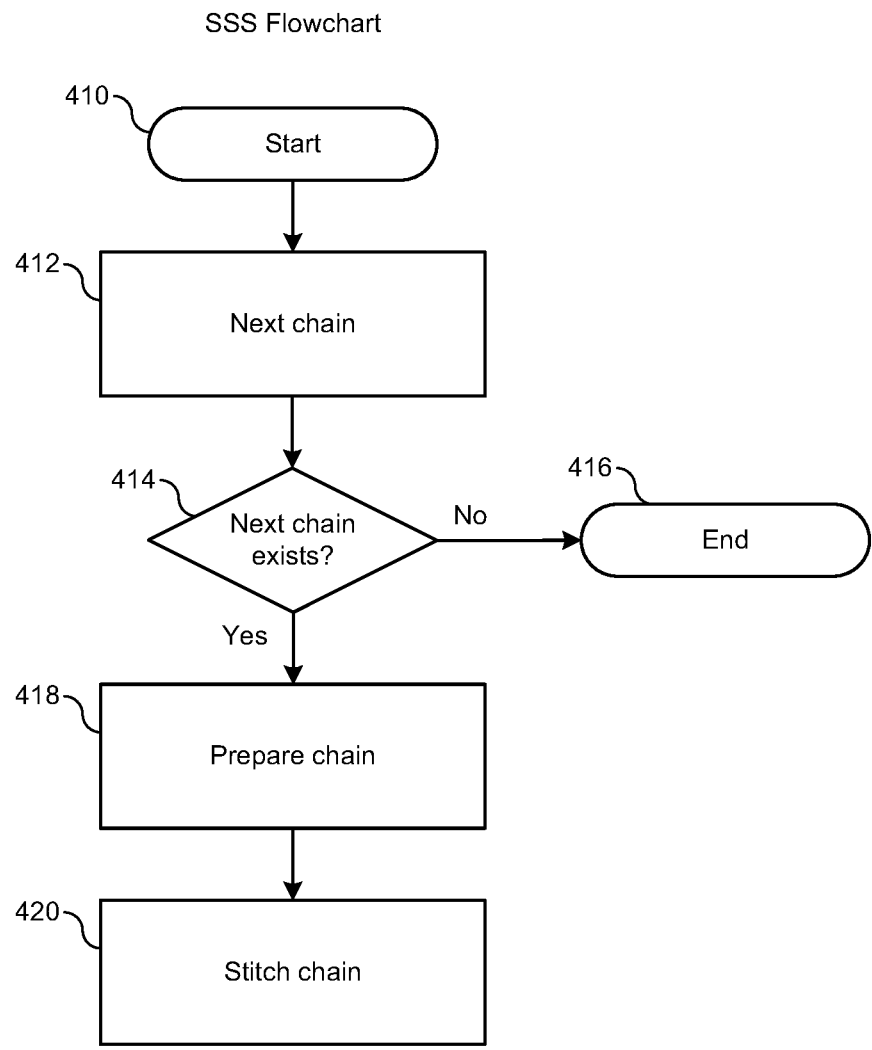
FIGS. 4A-4C illustrate a process flow diagram of a method for implementing sleep signal stitching in accordance with various implementations described herein.
Figure 4B:
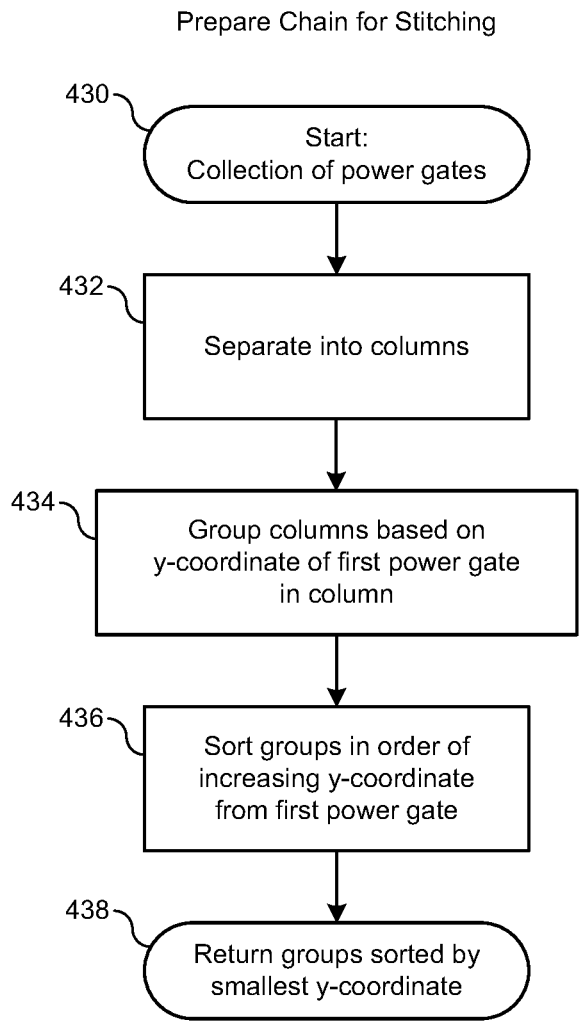
Figure 4C:
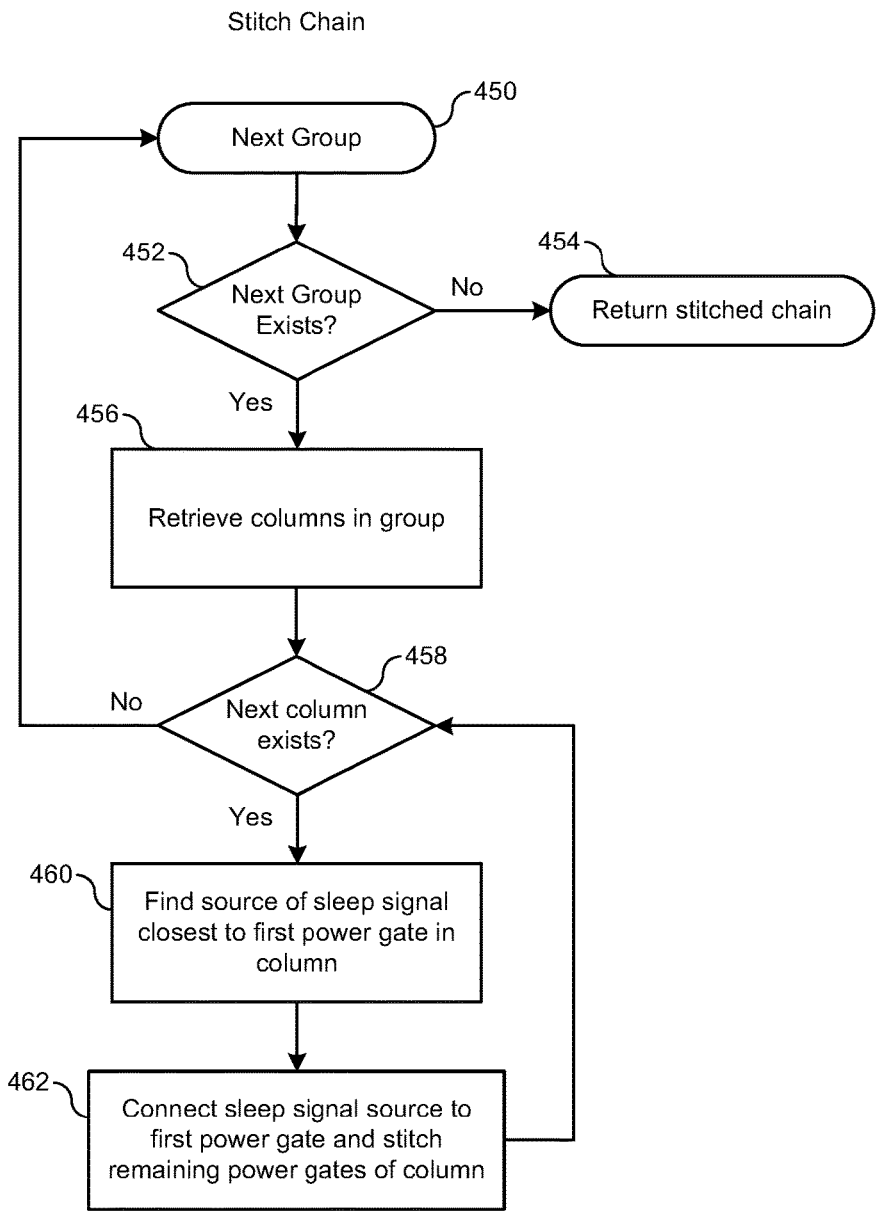

FIGS. 4A-4C illustrate process diagrams of a method 400 for implementing sleep signal stitching in accordance with implementations described herein. In particular, FIG. 4A illustrates an overall process flow diagram for method 400, FIG. 4B illustrates a process flow diagram of method 400 for preparing chains for stitching, and FIG. 4C illustrates a process flow diagram of method 400 for stitching chains.

It should be understood that even though method 400 may indicate a particular order of operation execution, in some cases, various certain portions of operations may be executed in a different order, and on different systems. In some other cases, additional operations and/or steps may be added to and/or omitted from method 400. Method 400 may be implemented in hardware and/or software. If implemented in hardware, method 400 may be implemented with various components, such as described herein above in reference to FIGS. 1-3B. If implemented in software, method 400 may be implemented as a program or software instruction process that may be configured for implementing various sleep signal stitching schemes and techniques as described herein. Further, if implemented in software, various instructions related to implementing method 400 may be stored in memory, wherein a computer, a server, or various other computing devices having a processor and memory may be configured to perform method 400.

In reference to FIGS. 4A-4C, method 400 may be utilized for implementing various sleep signal stitching schemes and techniques as described herein. For instance, method 400 may be utilized for a floorplan having one chain; however, a floorplan having multiple chains may be stitched by repeatedly applying method 400 to each chain.

For method 400, an input may refer to a collection of power gates, a control pin, and obstructions, wherein the power gates may not receive a sleep signal. An output may refer to the collection of power gates, the control pin, and the obstructions, wherein the power gates receive the sleep signal. Thus, method 400 may provide two phases, such that in a first phase, the floorplan is prepared for stitching, and in a second phase, the floorplan is stitched.

FIG. 4A illustrates an overall process flow diagram for method 400, which may refer to a sleep signal stitching (SSS) flowchart. At block 410, method 400 may start, and at block 412, method 400 may select a (next) chain. At decision block 414, method 400 may determine whether a (next) chain exists. If no, then at block 416, method 400 terminates. If yes, then at block 418, method 400 may prepare a (next) chain for stitching, as shown further in FIG. 4B. At block 420, method 400 may stitch the (next) chain, as shown further in FIG. 4C.

FIG. 4B illustrates a process flow diagram of method 400 for preparing chains for stitching 418. At block 430, method 400 may start with a collection of power gates. At block 432, method 400 may separate the collection of power gates into one or more columns. In some cases, power gates (or cells) in a given column may have a same x-coordinate, and power gates (or cells) in different columns may have a different x-coordinate. At block 434, method 400 may group columns based on a y-coordinate of a first power gate in a column. In some cases, once columns are identified, columns may be placed into groups, and columns in a given group may have a first power gate (or cell) with a same y-coordinate. At block 436, method 400 may sort groups in order of increasing y-coordinate from the first power gate in the column. At block 438, method 400 may return groups sorted by smallest y-coordinate. In some cases, groups may be sorted based on their y-coordinates, wherein columns in a group may have the same y-coordinate of their first power gate (or cell). Thus, a first group may have the smallest y-coordinate, and a second group may have the next smallest y-coordinate, and so on.

In some scenarios, the process flow in FIG. 4B may refer to a first phase 1: preparation. At block 430, method 400 may select a chain, and read a set of power gates in the chain. At block 432, method 400 may separate the power gates into a set of columns, wherein each column may comprise an ordered sequence of power gates in which power gates in the sequence have a same x-coordinate, and power-gates within a column (sequence) may be ordered according to an increasing y-coordinate. If a column is interrupted by an obstruction, method 400 may create multiple segments from the column in which one segment lies entirely below the obstruction and the other segment lies entirely above the obstruction. Method 400 may perform this procedure for multiple obstructions that interrupt this column and for each other column. If a column is not interrupted by an obstruction, this results in a segment that remains as an original column. The result of this process is a collection of vertical segments.

At block 434, method 400 may create a group for segments having a same value of the y-coordinate of their lower-most power gate, and this may create several groups of power gates. In each group, the y-coordinate of a lower-most cell is the same. At block 436, method 400 may sort each group according to increasing y-coordinate of the lower-most power gate. After sorting, the first group may include segments from columns with a lower-most cell having a smallest possible value of the y-coordinate (e.g., at the bottom of the floorplan). The second group may include segments with the lower-most cell having a second smallest value of the y-coordinate and so on. For example, suppose there are N groups labelled first group, second group, . . . , etc. Method 400 may create a group called S having one or more possible sources of a sleep signal and add the control-pin as the sole member of this group. The floorplan is now prepared and ready for stitching. Thus, in some cases, after the preparation phase (e.g., before any stitching has started), a source of a sleep signal may be the control pin.

FIG. 4C illustrates a process flow diagram of method 400 for stitching chains 420. At block 450, method 400 may start with a (next) group. At decision block 452, method 400 may determine whether a next group exists. If no, then at block 454, method 400 may return a stitched floorplan, wherein each of the chains have been stitched. Otherwise, if yes, then at block 456, method 400 may retrieve columns in a group. At decision block 458, method 400 may determine whether a next column exists. If no, then method 400 returns to block 450 to process a next group. Otherwise, if yes, then at block 460, method 400 may find a source of a sleep signal that is closest to a first power gate in a column. At block 462, method 400 may connect or couple the sleep signal source to the first power gate and stitch the remaining power gates in the column.

In some scenarios, the process flow in FIG. 4C may refer to a second phase 2: stitching. Method 400 may process a first group (block 450) as follows. For each segment, method 400 may connect the SLEEP_OUT of the control pin to the SLEEP_IN pin of the first power gate in each segment in first group. Then, method 400 may connect or couple the SLEEP_OUT pin of the first power gate to the SLEEP_IN pin of the second (or next) power gate and so on until each of the power gates in the segment are connected or coupled to a sleep signal. Method 400 may add segments in first group to S thereby making the power gates in first group candidates to provide a sleep signal. For instance, once the power gates in the first group are stitched, at least one of the power gates from the first group (and/or the control pin) may supply a sleep signal to the next group, such as, e.g., the second group.

Method 400 may process a next group second group (block 452) as follows. For each segment in second group, method 400 may find the sleep signal source that is closest to the first power gate in the segment (block 458). Method 400 may find the sleep signal source that is closest to the last power gate in the segment. Method 400 may select the (source and power gate) pair that may have the smallest separation and connect or couple the SLEEP_OUT pin of the source to the SLEEP_IN pin of the power gate. If both are the same, method 400 may select the pair with the source having the smallest fan-out of its SLEEP_OUT pin. Method 400 may then stitch (e.g., connect or couple) the power gates within the segment in the order in which they appear (block 462). Method 400 may add the segments in second group to the group S thereby making the control pin and segments in first group and second group candidates to provide a sleep signal.

Method 400 may continue with another next group third group and so on until each of the groups have been stitched (blocks 458, 460, 463). Generally, this may be possible when the power gates are placed in vertical columns. Thus, each power gate may belong to one column.

In some implementations, method 400 may utilize a Steiner metric to compute or calculate a distance between two (2) points. For example, let p1 and p2 be two distinct points in a two-dimensional plane with coordinates, (x1, y1) and (x2, y2), respectively. The Steiner distance between p1 and p2 may be defined as |x2−x1|+|y2−y1|. If however a straight line between the two points is interrupted by an obstruction, the Steiner distance may be computed by following edges of the obstruction. The sleep signal stitching (SSS) schemes and techniques described herein may frequently compute the Steiner distance between two points in a floorplan when the floorplan comprises and arbitrary number of obstructions (macros or hard macros).

When there is a single hard macro between (x1, y1) and (x2, y2), the process of computing the distance begins by drawing a straight line from (x1, y1) and (x2, y2) and finding all points of the line that intersect the boundary of hard macro. The distance from (x1, y1) and (x2, y2) may be computed as follows. In a first step, start at (x1, y1), and use the Steiner metric to compute the distance from (x1, y1) to first point of intersection (call this i1). In a second step, since the point i1 is on the boundary of the hard macro, the next point in the path is also on the boundary of the same hard macro (call this i2). In a third step, compute the distance from i1 to i2 by following the edges of the hard macro and summing the length of these edges. Since there are two possible directions (clockwise and counter-clockwise), choose the one that is the smallest and add to the distance in the first step. In a fourth step, the next point in the path will be either another point on the boundary of the hard macro or it will be (x2, y2). In a fifth step, if it is on the boundary of the hard macro use the procedure in the third step to compute the distance, add to the total, and repeat. If it is (x2, y2) use the Steiner metric to compute the distance and add to the total. There are no more points. The total distance has been computed. In some cases, if there are multiple hard macros between (x1, y1) and (x2, y2), then the procedure of the first through fifth steps may be applied to the multiple hard macros by using the Steiner metric to calculate or compute the Steiner distance when two points in the path are on edges of distinct hard macros.

In some scenarios, method 400 may compute or calculate the distance using this method. For example, let p1 and p2 be two distinct points in a two-dimensional plane with coordinates (x1, y1) and (x2, y2), respectively. Suppose that the straight line joining p1 and p2 intersects a set of rectilinear polygons. An input may refer to two points and a set of rectilinear polygons intersected by the straight line joining the two points. An output may refer to a shortest Steiner distance between the points where the Steiner path follows the edges of the polygons. For each polygon that intersects the straight line joining p1 and p2, method 400 may find the points of intersection of the line and the edges of the polygon. Method 400 may sort the points according to Euclidean distance from p1. In some cases, there may be an even number of intersection points, and an observation may be made that the first and second intersection points may fall on distinct edges of the same polygon. Similarly, this observation may be made for third and fourth intersection points, fifth and sixth intersection points, and so on.

Starting from p1, method 400 may compute the Steiner distance from p1 to the first intersection point. Method 400 may find a shortest distance from the first intersection point to the second intersection point by travelling along edges of the polygon that include the two intersection points. Method 400 may add this value to the current total. Method 400 may find a Steiner distance from the second intersection point and the third intersection pint, which may fall on an edge of a distinct polygon. Method 400 may add this to the current total. Method 400 may apply this procedure for the third and fourth intersection points and so on until a last intersection point is reached. Method 400 may find the Steiner distance from the last intersection point to p2, and method 400 may add the Steiner distance to the current total. In some cases, this produces the shortest Steiner distance from p1 to p2 by navigating an arbitrary number intervening polygons.

Pursuant to various techniques described herein, method 400 may automate connecting or coupling the power gates in one chain in a single step. Method 400 may handle arbitrary floorplans with and without healed power gate columns. Method 400 may create connections when some of the power gates do not have the SLEEP_OUT signal.

As described herein, a control pin may comprise a primordial source of the sleep signal, and the control pin may include a source from which components, such as, e.g., power gates, receive the sleep signal. A power-gate may comprise a cell with at least two (2) pins, such as, e.g., SLEEP_IN pin and SLEEP_OUT pin. The SLEEP_IN pin of the power gate may receive the sleep signal from the control pin or from the SLEEP_OUT pin of another power gate. In some instances, some SLEEP_OUT pins may not be connected. A chain may comprise a collection of power gates, a control pin, and a state, which may describe connections of the SLEEP_IN pin and the SLEEP_OUT pin after sleep signal stitching (SSS). In some cases, collections may be referred to as chains even before stitching is performed. An obstruction may comprise a two-dimensional (2D) bounded rectilinear region, such as, e.g., rectangle or L-shape. Some obstructions may interrupt a linear, vertical sequence of power gates. A floorplan may comprise a collection of chains and a collection of non-overlapping obstructions, and each obstruction may be bounded within the floorplan. Further, where a distance between two points in a floorplan is identified, the distance may be measured using a Steiner metric. If obstructions exist between the two points, the distance may be computed or calculated by following edges of the obstructions.

Further, sleep signal stitching (SSS) may commence after insertion of power gates. SSS may not change a number or physical locations of the power gates, and SSS may merely supply each power gate with a sleep signal. In some cases, a floorplan may include a control pin, and from the point of view of SSS, each of the power gates may be considered similar. The coordinate axes of the two-dimensional area occupied by the floorplan may refer to a right-handed coordinate system with an x-coordinate increasing from left to right and a y-coordinate increasing from bottom to top, and there should be no loss of generality resulting from this assumption.

Figure 5:
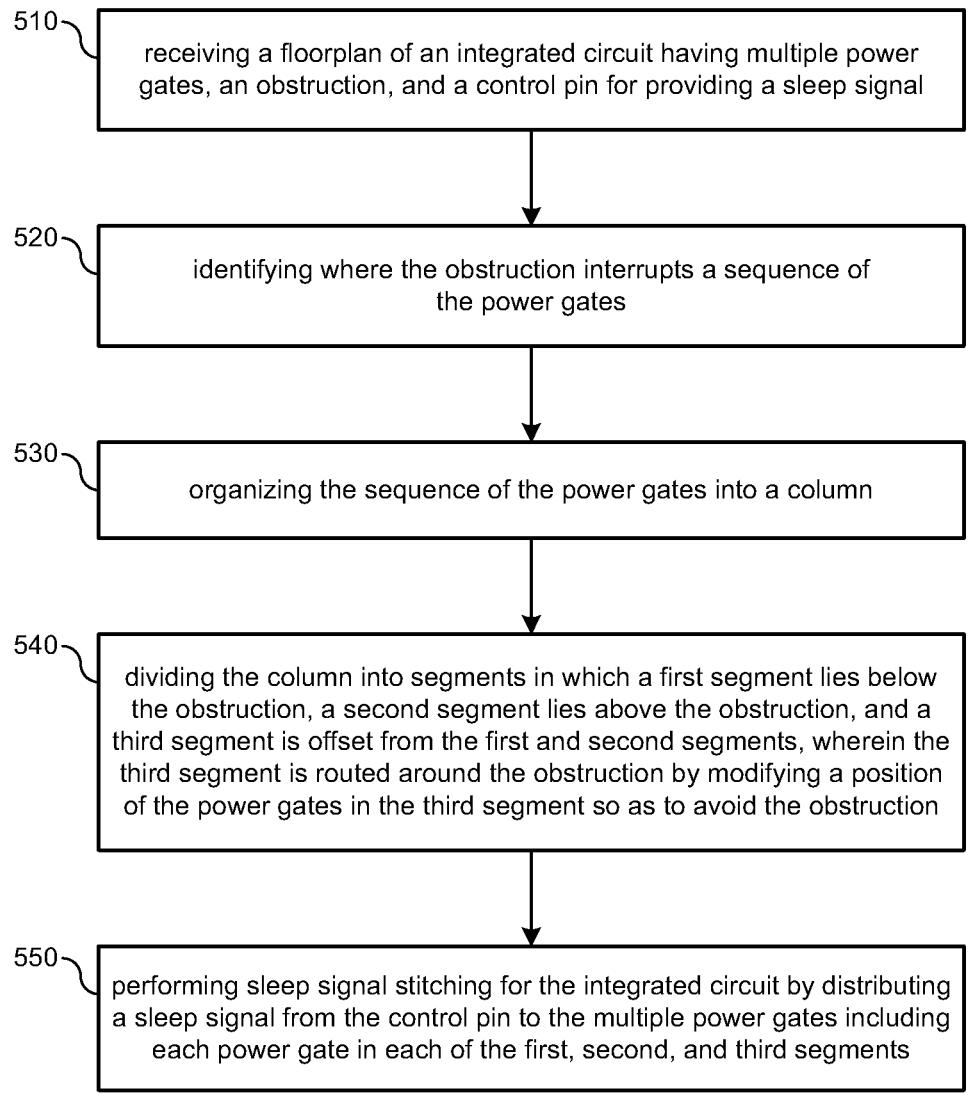
FIG. 5 illustrates another process flow diagram of a method for implementing sleep signal stitching in accordance with various implementations described herein.

FIG. 5 illustrates a process flow diagram of a method 500 for implementing sleep signal stitching in accordance with various implementations described herein.

It should be understood that even though method 500 may indicate a particular order of operation execution, in some cases, various certain portions of operations may be executed in a different order, and on different systems. In some other cases, additional operations and/or steps may be added to and/or omitted from method 500. Method 500 may be implemented in hardware and/or software. If implemented in hardware, method 500 may be implemented with various components, such as described herein above in reference to FIGS. 1-4C. If implemented in software, method 500 may be implemented as a program or software instruction process that may be configured for implementing various sleep signal stitching schemes and techniques as described herein. Further, if implemented in software, various instructions related to implementing method 500 may be stored in memory, wherein a computer, a server, or various other computing devices having a processor and memory may be configured to perform method 500.

In reference to FIG. 5, method 500 may be utilized for implementing various sleep signal stitching schemes and techniques. At block 510, method 500 may receive a floorplan of an integrated circuit having multiple power gates, an obstruction, and a control pin for providing a sleep signal. Each power gate may comprise a cell with at least two pins including a sleep input pin and a sleep output pin, and the sleep input pin of each power gate may receive the sleep signal from the control pin or from the sleep output pin of another power gate. The obstruction may comprise a rectilinear region in a form of a rectangle or an L-shape. The obstruction may be defined by a macro that represents a component of the integrated circuit having a core, a memory, a double data rate (DDR) unit, or a power management unit.

At block 520, method 500 may identify where the obstruction interrupts a sequence of the power gates. The sequence of power gates may comprise a linear sequence of the power gates arranged in one or more vertical columns, and the obstruction may interrupt the linear sequence of the power gates.

At block 530, method 500 may organize the sequence of the power gates into a column, and at block 540, method 500 may divide the column into segments in which a first segment lies below the obstruction, a second segment lies above the obstruction, and a third segment is offset from the first and second segments. Information may be received for the third segment being routed around the obstruction by modifying a position of the power gates in the third segment so as to avoid the obstruction. The information may include information related to modifying the position of the power gates in the third segment for relocating the position of the power gates in the third segment around the obstruction. The method 500 may measure a distance between two points in the floorplan by using a Steiner metric, and if the obstruction is between the two points, then the distance may be computed by following edges of the obstruction.

At block 550, method 500 may perform sleep signal stitching for the integrated circuit by distributing a sleep signal from the control pin to the multiple power gates including each power gate in each of the first, second, and third segments. The method 500 may distribute the sleep signal from the control pin to the multiple power gates by coupling the control pin to each power gate to thereby provide the sleep signal to each power gate. In some instances, arrival of the sleep signal may switch each power gate to an active state (i.e., an ON state), which then supplies power to rails from which standard cells (SC) of the integrated circuit derive their power.

Figure 6:
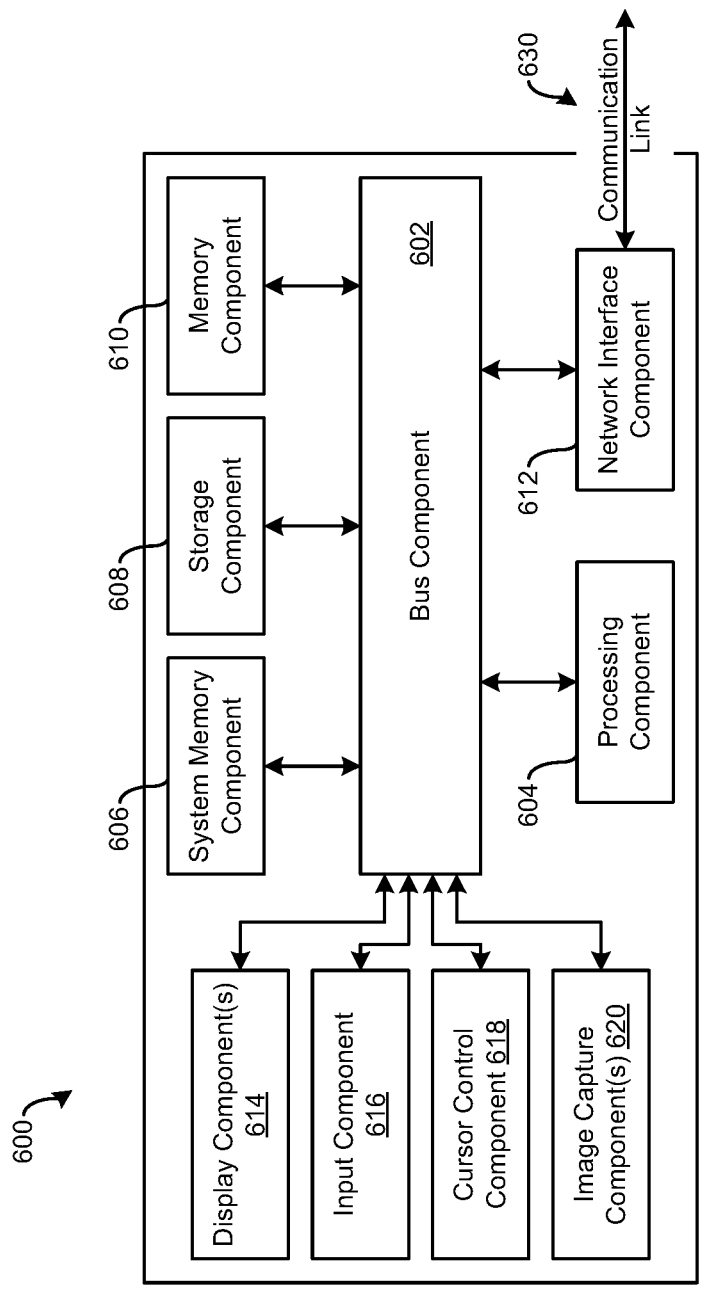
FIG. 6 illustrates a block diagram of a computing device in accordance with various implementations described herein.

FIG. 6 is a block diagram of a computing device 600 suitable for implementing various implementations described herein, including, e.g., the computing device 102 and components associated therewith in FIG. 1. Thus, the computing device 600 may be embodied as the computing device 102 and be configured for network communication with various other computing devices over a wired or wireless network.

The computer device 600 may be implemented as various types of computing devices, such as, e.g., a server, a personal computer (PC), a laptop, a notebook, a mobile communication device, or similar. The computer device 600 may include a bus 602 (or other communication mechanism for communicating information) that interconnects the various subsystems and/or components, such as, e.g., processing component 604 (e.g., processor, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., CRT or LCD), input component 616 (e.g., keyboard), cursor control component 618 (e.g., mouse or trackball), and image capture component 620 (e.g., analog or digital camera). In some implementations, disk drive component 610 may comprise a database having one or more disk drive components.

The computer device 600 may perform various specific operations by processor 604 executing one or more sequences of one or more instructions contained in system memory component 606. Such instructions may be read into system memory component 606 from another computer readable medium, such as static storage component 608 or disk drive component 610. In some cases, hard-wired circuitry may be used in place of or in combination with software instructions to thereby implement the various sleep signal stitching (SSS) schemes and/or techniques described herein.

Logic may be encoded in a computer readable medium, which may refer to any medium that participates in providing instructions to processor 604 for execution. Such a medium may take many forms, including but not limited to, non-volatile media and volatile media. In various implementations, non-volatile media includes optical or magnetic disks, such as disk drive component 610, and volatile media includes dynamic memory, such as system memory component 606. In some implementations, data and information related to execution instructions may be transmitted to computer device 600 via a transmission media, such as, e.g., in a form of acoustic or light waves, including those generated during radio wave and infrared data communications. Transmission media may include coaxial cables, copper wire, and/or fiber optics, including wires that comprise bus 602.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various implementations, execution of instruction sequences to practice the sleep signal stitching schemes and techniques described herein may be performed by computer device 600. In other implementations described herein, a plurality of computer systems 600 coupled by communication link 630 (e.g., LAN, WLAN, PTSN, and/or various other wired or wireless networks, including telecommunications, mobile, and/or cellular phone networks) may perform instruction sequences to practice implementations of the present disclosure in coordination with one another.

In various implementations, the computer device 600 may transmit and receive messages, data, information and instructions, including programs (i.e., application code) through communication link 630 and communication interface 612. Further, the received program code may be executed by the processor 604 as received and/or stored in disk drive component 610 or some other non-volatile storage component for execution.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way.

While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

Described herein are implementations of an apparatus. The apparatus may include a receiver module that receives a floorplan of an integrated circuit having multiple power gates, an obstruction, and a control pin for providing a sleep signal. The apparatus may include an identifier module that identifies where the obstruction interrupts a sequence of the power gates, organizes the sequence of the power gates into a column, and divides the column into segments in which a first segment lies below the obstruction, a second segment lies above the obstruction, and a third segment is offset from the first and second segments. The third segment may be routed around the obstruction. The apparatus may include a stitcher module that performs sleep signal stitching for the integrated circuit by distributing a sleep signal from the control pin to the multiple power gates that includes each power gate in each of the first, second, and third segments.

Described herein are implementations of a method. The method may include receiving a floorplan of an integrated circuit having multiple power gates, an obstruction, and a control pin for providing a sleep signal. The method may include identifying where the obstruction interrupts a sequence of the power gates. The method may include organizing the sequence of the power gates into a column. The method may include dividing the column into segments in which a first segment lies below the obstruction, a second segment lies above the obstruction, and a third segment is offset from the first and second segments. The third segment may be routed around the obstruction by modifying a position of the power gates in the third segment so as to avoid the obstruction. The method may include performing sleep signal stitching for the integrated circuit by distributing a sleep signal from the control pin to the multiple power gates that includes each power gate in each of the first, second, and third segments.

Described herein are implementations of a non-transitory computer-readable medium having stored thereon a plurality of computer-executable instructions that, when executed by a computer, cause the computer to receive a floorplan of an integrated circuit having multiple power gates, an obstruction, and a control pin for providing a sleep signal. The instructions may cause the computer to identify where the obstruction interrupts a sequence of the power gates. The instructions may cause the computer to organize the sequence of the power gates into a column. The instructions may cause the computer to divide the column into segments in which a first segment lies below the obstruction, a second segment lies above the obstruction, and a third segment is offset from the first and second segments. The third segment may be routed around the obstruction by modifying a position of the power gates in the third segment so as to avoid the obstruction. The instructions may cause the computer to perform sleep signal stitching for the integrated circuit by distributing a sleep signal from the control pin to the multiple power gates that includes each power gate in each of the first, second, and third segments.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a receiver module that receives a floorplan of an integrated circuit having multiple power gates, an obstruction, and a control pin for providing a sleep signal;
an identifier module that identifies where the obstruction interrupts a sequence of the multiple power gates, organizes the sequence of the multiple power gates into a column, and divides the column into segments in which a first segment lies below the obstruction, a second segment lies above the obstruction, and a third segment is offset from the first segment and the second segment, wherein the third segment is routed around the obstruction; and
a stitcher module that performs a sleep signal stitching for the integrated circuit by distributing the sleep signal from the control pin to the multiple power gates that include each power gate in each segment of the first segment, the second segment, and the third segment.

2. The apparatus of claim 1, wherein the floorplan comprises a collection of chains, and wherein each chain in the collection of chains comprises a collection of power gates coupled to the control pin.

3. The apparatus of claim 1, wherein the floorplan comprises the obstruction as part of a collection of one or more non-overlapping obstructions.

4. The apparatus of claim 1, wherein the obstruction comprises a rectilinear obstruction.

5. The apparatus of claim 1, wherein the sequence of the multiple power gates comprises a linear sequence of the multiple power gates arranged in one or more vertical columns, and wherein the obstruction interrupts the linear sequence of the multiple power gates.

6. The apparatus of claim 1, wherein the third segment comprises the multiple power gates in a relocated position around the obstruction.

7. The apparatus of claim 1, wherein a distance between two points in the floorplan is measured using a Steiner metric, and wherein if the obstruction is between the two points, then the distance is computed by following edges of the obstruction.

8. The apparatus of claim 1, wherein the stitcher module distributes the sleep signal from the control pin to the multiple power gates by coupling the control pin to each power gate of the multiple power gates to thereby provide the sleep signal to said each power gate.

9. The apparatus of claim 1, wherein each power gate of the multiple power gates is a cell with at least two pins including a sleep input pin and a sleep output pin, and wherein the sleep input pin of said each power gate receives the sleep signal from the control pin or from the sleep output pin of another power gate of the multiple power gates.

10. The apparatus of claim 1, wherein the obstruction is defined by a hard macro that represents a component of the integrated circuit having a core, a memory, a double data rate (DDR) unit, or a power management unit.

11. The apparatus of claim 1, wherein arrival of the sleep signal at each power gate of the multiple power gates switches each power gate to an active state which then supplies power to rails from which standard cells (SC) of the integrated circuit derive their power.

12. A method, comprising:
    receiving a floorplan of an integrated circuit having multiple power gates, an obstruction, and a control pin for providing a sleep signal;
    identifying where the obstruction interrupts a sequence of the multiple power gates;
    organizing the sequence of the multiple power gates into a column;
    dividing the column into segments in which a first segment lies below the obstruction, a second segment lies above the obstruction, and a third segment is offset from the first segment and the second segment, wherein the third segment is routed around the obstruction by modifying a position of the multiple power gates in the third segment so as to avoid the obstruction; and
    performing a sleep signal stitching for the integrated circuit by distributing the sleep signal from the control pin to the multiple power gates that include each power gate in each segment of the first segment, the second segment, and the third segment.

13. The method of claim 12, wherein the obstruction comprises a rectilinear region in a form of a rectangle or an L-shape.

14. The method of claim 12, wherein the sequence of the multiple power gates comprises a linear sequence of the multiple power gates arranged in one or more vertical columns, and wherein the obstruction interrupts the linear sequence of the multiple power gates.

15. The method of claim 12, wherein modifying a position of the multiple power gates in the third segment comprises relocating the position of the multiple power gates in the third segment around the obstruction.

16. The method of claim 12, wherein a distance between two points in the floorplan is measured using a Steiner metric, and wherein if the obstruction is between the two points, then the distance is computed by following edges of the obstruction.

17. The method of claim 12, wherein the distributing the sleep signal from the control pin to the multiple power gates comprises coupling the control pin to each power gate of the multiple power gate to thereby provide the sleep signal to said each power gate.

18. The method of claim 12, wherein each power gate of the multiple power gate is a cell with at least two pins including a sleep input pin and a sleep output pin, and wherein the sleep input pin of said each power gate receives the sleep signal from the control pin or from the sleep output pin of another power gate of the multiple power gates.

19. The method of claim 12, wherein the obstruction is defined by a hard macro that represents a component of the integrated circuit having a core, a memory, a double data rate (DDR) unit, or a power management unit.

20. A non-transitory computer-readable medium having stored thereon a plurality of computer-executable instructions that, when executed by a computer, cause the computer to:
    receive a floorplan of an integrated circuit having multiple power gates, an obstruction, and a control pin for providing a sleep signal;
    identify where the obstruction interrupts a sequence of the multiple power gates;
    organize the sequence of the multiple power gates into a column;
    divide the column into segments in which a first segment lies below the obstruction, a second segment lies above the obstruction, and a third segment is offset from the first segment and the second segment, wherein the third segment is routed around the obstruction by modifying a position of the multiple power gates in the third segment so as to avoid the obstruction; and
    perform a sleep signal stitching for the integrated circuit by distributing the sleep signal from the control pin to the multiple power gates that include each power gate in each segment of the first segment, the second segment, and the third segment.

* * * * *